(12) United States Patent
Seifert (10) Patent No.: US 9,863,398 B2
(45) Date of Patent: Jan. 9, 2018

(54) WIND-POWERED ROTOR AND ENERGY GENERATION METHOD USING SAID ROTOR

(75) Inventor: Jost Seifert, Manching (DE)

(73) Assignee: Airbus Defence and Space GmbH, Taufkirchen (DE)

(*) Notice: Subject to any disclaimer, the term of this patent is extended or adjusted under 35 U.S.C. 154(b) by 1235 days.

(21) Appl. No.: 13/996,651

(22) PCT Filed: Aug. 1, 2011

(86) PCT No.: PCT/DE2011/001536
§ 371 (c)(1),
(2), (4) Date: Aug. 26, 2013

(87) PCT Pub. No.: WO2012/083907
PCT Pub. Date: Jun. 28, 2012

(65) Prior Publication Data
US 2013/0328320 A1 Dec. 12, 2013

(30) Foreign Application Priority Data
Dec. 22, 2010 (DE) .................. 10 2010 055 687

(51) Int. Cl.
*F03D 3/02* (2006.01)
*F03D 3/00* (2006.01)
(Continued)

(52) U.S. Cl.
CPC ............ *F03D 3/02* (2013.01); *F03D 3/002* (2013.01); *F03D 3/005* (2013.01); *F03D 3/04* (2013.01);
(Continued)

(58) Field of Classification Search
CPC . F03D 3/002; F03D 3/005; F03D 3/02; F03D 3/04; F03D 9/00; F03D 9/002;
(Continued)

(56) References Cited

U.S. PATENT DOCUMENTS 8,618,690 B2* 12/2013 Seifert .................. F03D 3/002
290/44
2008/0197639 A1* 8/2008 Brander ................ F03D 1/025
290/55
(Continued)

FOREIGN PATENT DOCUMENTS

DE            35 01 807 A1    7/1986
DE    21 2008 000 104 U1    12/2010
(Continued)

OTHER PUBLICATIONS

German-language Written Opinion dated Jun. 11, 2012 (Seven (7) pages).
(Continued)

*Primary Examiner* — Mark Laurenzi
*Assistant Examiner* — Paul Thiede
(74) *Attorney, Agent, or Firm* — Crowell & Moring LLP (57) ABSTRACT

A wind power rotor has a first and second rotor device. The first rotor device rotates about a first axis of rotation and has at least two rotor blades moving on a peripheral track about the first axis of rotation. The rotor blades are such that they describe a virtual first shell surface of a virtual first rotating body upon rotation about the first axis of rotation. The second rotor device rotates about a second axis of rotation and has a second rotating body with a closed second shell surface. The second rotating body is arranged at least partially inside of the virtual first rotating body. The first rotor device can be driven by wind in a first direction of rotation and the second rotor device has a drive device, and can be driven in a second direction of rotation which is opposite that of the first direction of rotation.

13 Claims, 11 Drawing Sheets (51) Int. Cl.
*F03D 3/04* (2006.01)
*F03D 9/00* (2016.01)
*F03D 9/25* (2016.01)

(52) U.S. Cl.
CPC ............... *F03D 9/00* (2013.01); *F03D 9/25* (2016.05); *F05B 2240/201* (2013.01); *F05B 2240/212* (2013.01); *F05B 2240/214* (2013.01); *Y02B 10/30* (2013.01); *Y02E 10/74* (2013.01)

(58) Field of Classification Search
CPC ............... F03D 3/007; F05B 2240/201; F05B 2240/212; F05B 2240/214; Y02E 10/74; F03B 13/12
USPC ............... 415/1; 290/55, 44; 416/128, 203
See application file for complete search history.

(56) References Cited

U.S. PATENT DOCUMENTS

2009/0243302 A1    10/2009  Eisenblaetter
2011/0140450 A1*   6/2011   Kawas ................ F03D 3/0418
                                                              290/55

FOREIGN PATENT DOCUMENTS

EP      2 098 723 A2        9/2009
IL      WO 2011039749 A1 *  4/2011  ............. F03B 13/12
WO      WO 2006/039727 A1   4/2006

OTHER PUBLICATIONS

International Search Report dated Jun. 11, 2012 with English translation (Eight (8) pages).

* cited by examiner

WIND-POWERED ROTOR AND ENERGY GENERATION METHOD USING SAID ROTOR

CROSS-REFERENCE TO RELATED APPLICATIONS

The present application claims priority to German Patent Application No. 10 2010 055 687.4, filed Dec. 22, 2010. U.S. patent application Ser. No. 13/333,174, filed Dec. 21, 2011, also claims priority to German Patent Application No. 10 2010 055 687.4.

BACKGROUND AND SUMMARY OF THE INVENTION

Exemplary embodiments of the present invention relate to a wind power rotor, a wind turbine, the use of a wind power rotor in a wind turbine, and to a method for converting wind energy into drive energy for the purpose of generating electrical current.

Rotors rotated by the wind and which drive a generator are typically employed to generate electrical energy using the wind. At least a portion of the wind energy is converted into electrical energy in the process. A further field of application of rotors is in wind turbines which perform work, such as pump or conveyance functions. The use of wind energy is also gaining in importance in the context of the use of renewable energy sources.

Exemplary embodiments of the present invention are directed to efficient exploitation of wind energy.

According to a first aspect of the invention, a wind power rotor has a first rotor device and a second rotor device. The first rotor device rotates about a first axis of rotation and has at least two rotor blades which move along a peripheral track around the first axis of rotation. The rotor blades are arranged in such a manner that they describe a virtual first shell surface of a virtual first rotation body about the first axis of rotation. The second rotor device rotates about a second axis of rotation and has a second rotating body with a closed second shell surface. The second rotating body is at least partially arranged inside the virtual first rotating body. The first rotor device can be driven by wind in a first direction of rotation for the purpose of converting wind energy into a drive force, and the second rotor device has a drive device and can be driven in a second direction of rotation that is opposite the first direction of rotation.

According to one exemplary embodiment of the invention, the second rotor device is constructed to achieve a deflection of a stream of air, the same caused by wind, inside the first rotor device, on the side thereof facing away from the wind, counter to the first direction of rotation.

By way of example, the deflection causes an incident flow on at least one of the rotor blades of the first rotor device, which generates an additional propulsion and therefore additional drive torque.

A Magnus effect is created by the rotation of the inner rotating body (i.e., the second rotating body), which leads to a deflection of a stream of air which is moving past. As a result of the deflection of the air, and/or a re-direction of the air stream, a rotor blade that already positioned in a region of the rotation track that faces away from the wind, as a result of an advanced rotation state, is additionally exposed to a stream of air, such that a corresponding propulsion is generated and a rotation of the first rotor device results. The deflection therefore functions such that a rotor blade positioned in the rearward region is exposed to an additional incident flow of wind, such that it is possible to generate a corresponding propulsion as a result of this additional circulation around the rotor blade, and this propulsion is available as additional drive force. In this way, the configuration provides an improved degree of efficiency.

Moreover, the deflection improves the start-up behavior of the wind power rotor. The wind power rotor according to the invention starts up at lower wind speeds compared to solutions that do not have the inner rotor (i.e., the second rotor). The deflection serves as a start-up aid, so to speak. For this reason, it is possible to exploit relatively low wind speeds at which other rotors cannot yet be operated.

According to one exemplary embodiment of the invention, the first axis of rotation is a first vertical axis of rotation, and the second axis of rotation is a second vertical axis of rotation.

According to an alternative exemplary embodiment of the invention, the first axis of rotation is a first horizontal axis of rotation, and the second axis of rotation is a second horizontal axis of rotation.

By way of example, the first axis of rotation and also the second axis of rotation can be designed as tilted and/or inclined axes of rotation relative to the horizontal and the vertical.

The terms "vertical" and "horizontal" refer to the installed position, meaning the operating position.

By way of example, the first and the second axes of rotation extend parallel to each other. The first and the second axes of rotation can also be oriented concentrically to each other, meaning that the first axis of rotation corresponds to the second axis of rotation in its position.

These embodiment variants named above apply both for vertical and for horizontal or inclined axes of rotation, which also particularly apply for the embodiments named below and also for the embodiments described in the figures.

The first and the second axes of rotation can also extend with a displacement from each other, wherein the displacement is designed in such a manner that the second rotating body is arranged during the rotation about the second axis of rotation at least partially inside the virtual first rotating body, and particularly does not touch or cross the virtual first shell surface.

By way of example, the displacement can be adjustable by means of an adjustment device, for example according to the strength of the wind or the direction of the wind.

The first axis of rotation can also extend at an incline to the second axis of rotation, wherein the inclination is designed in such a manner that the second rotating body is arranged during the rotation about the second axis of rotation at least partially inside of the virtual first rotating body, and particularly does not touch or cross the virtual first shell surface.

The inclination of the two axes of rotation can likewise be adjustable by means of an inclination adjustment device.

The rotor blades travel at least partially around the second rotating body during the rotation, meaning that at least a sub-region of the second rotating body is circled by the rotor blades.

The rotor blades each have a longitudinal extension, and extend in the direction of the first axis of rotation, wherein the term "in the direction of" refers to the fact that the longitudinal extension occurs between a first point and second point, wherein the connection line between the first and second points has a directional component running parallel to the first axis of rotation.

The rotor blades can also be characterized as repellers driven by the wind.

The rotor blades can be designed as fixed with respect to the tangential angular position thereof—meaning that they do not alter their angular position during the rotation.

By way of example, the rotor blades have a symmetric cross-section. According to a further example, the rotor blade has a symmetric wing cross-section with a first edge running to a point, and a second edge designed with a rounded shape, wherein the second edge is arranged forward in the direction of rotation.

The rotor blades can also have a wing cross-section with a curvature, however. The curvature can also be implemented by a moving flap on the front edge of the wing or the back edge of the wing.

In addition to the named variants having two rotor blades, three, four, or more rotor blades can be included. This of course also applies for the different combinations of the features described above and in the following.

The rotor blades can be divided into rotor blade segments, wherein the rotor blade segments can have different designs such that the rotor blades have a different design along the complete length thereof.

According to one exemplary embodiment, the first rotor device has a Darrieus rotor.

By way of example, the upper and lower ends of the rotor blades—for example in the case of axes of rotation running vertically—or the lateral ends—for example in the case of axes of rotation running horizontally—are arranged closer to the axis of rotation than in the region between the two ends.

According to one exemplary embodiment of the invention, the two ends of the rotor blades are arranged closer to the axis of rotation than the region thereof between the two ends, wherein the rotor blades project outward in a bow-shape.

The rotor blades can have a hyperbolic shape in the longitudinal direction; for example they can have a chain shape (hyperbolic cosine).

However, the rotor blades can also have a straight design in the longitudinal direction, and run parallel to the first axis of rotation, or be inclined with respect to the first axis of rotation.

According to one exemplary embodiment of the invention, the rotor blades run parallel to the first and to the second axis of rotation. By way of example, the rotor blades can be designed as H-Darrieus rotors.

According to a further example, the rotor blades can also be curved in a helical shape.

The second rotating body can partially project out of the virtual first rotating body in the axial direction. The second rotating body can also project out of the virtual first rotating body with its end face or both end faces thereof.

According to one exemplary embodiment of the invention, the second rotating body is arranged entirely inside the virtual first rotating body.

The second rotating body in this case is arranged inside the peripheral track of the first rotating body.

The closed second shell surface is a peripheral surface.

The second rotating body can have a circular cross-section (diameter) that remains constant around the second axis of rotation, and can form a cylinder.

The second rotating body can also have a circular diameter that varies evenly around the second axis of rotation, and can form a truncated cone.

The second rotating body can also be composed of different truncated cone segments and/or cylinder segments.

According to one exemplary embodiment of the invention, the second rotating body has different diameters along the second axis of rotation.

The circumference of the second rotating body can be matched to the virtual first shell surface; for example, it can form a defined proportion and/or a defined difference with respect to the shell surface.

The second rotating body can have a hyperbolic contour in a longitudinal cross-section along the second axis of rotation.

The second rotating body can be divided into segments that can be driven at different speeds.

The second rotating body can have an end disk projecting beyond the second shell surface, in the region of its first and/or second end. As an alternative or in addition thereto, the second rotating body can have a plurality of disks arranged between the two ends, wherein the disks have a larger diameter than one or both of the neighboring shell surface segments.

The drive device can have a coupling, for example a direct coupling of the first rotor device and the second rotor device, thereby including a reversal of the direction of rotation of the second rotor device.

By way of example, the wind power acting on the first rotor device can also drive the second rotor device.

According to a further example, a start-up aid can be included supporting the start-up of the rotor.

According to one exemplary embodiment of the invention, the drive device has a gear device between the first rotor device and the second rotor device, wherein the gear device functions to transmit the rotation speed, in addition to reversing the direction of rotation.

The transmission ratio of the gear device can be variable, for example continuously or in steps.

By way of example, the gear device can have a first ratio that is dependent on the rotation speed of the first rotor device.

By way of example, the drive device can also be disengaged by an electric motor driven by electrical current.

By way of example, the electrical current can be generated by means of the drive force, meaning that the electric motor can be driven by generator current, for example.

The electric motor can, for example, have a regulator and offer a variable transmission ratio.

The transmission in this case can be dependent on the actual inflowing wind speed and/or the strength of the wind.

The second rotating body can be driven at a circumferential speed that is approximately 0.5 to 4 times the inflowing air speed of the first rotor device.

The first rotor device can have a circumferential speed that is approximately 50% of the inflowing air speed of the wind.

The rotation ratio between the first and the second rotor devices is, by way of example, approximately 1:2 to 1:8, wherein the directions of rotation run opposite each other, as already indicated.

The ratio of the inflowing air speed of the wind power rotor/the circumferential speed of the first rotor device/the circumferential speed of the second rotating body is approx. 0.5/1/1 to 4, wherein in this case as well, the directions of rotation of the two rotor devices, as indicated above, run opposite each other. The circumferential speed in this case refers to the circumferential speed at the point of the maximum diameter.

According to one exemplary embodiment of the invention, the drive device is constructed to also drive the second rotating body in the first direction of rotation if selected.

In this case, the rotating body rotates in the same direction as the rotor blades. This can be implemented as a kind of braking effect, for example at excessively high wind speeds, because the degree of efficiency and/or the efficiency is significantly lower with rotation in the same direction—in contrast to the opposite rotation directions according to the invention of the first and the second rotating bodies, wherein the configuration leads to an improvement of the efficiency and/or to an improved exploitation of the wind energy, as illustrated above.

According to a second aspect of the invention, a wind turbine is provided that has a rotor for converting wind movement into a rotary movement, a generator for converting the energy of movement of the rotary movement into electrical energy, and a gear device for coupling the rotor to the generator to transmit the rotary movement to the generator. The rotor in this case is designed as a wind power rotor according to one of the previously described embodiments and examples/aspects.

The rotor axis can be arranged vertical or horizontal, or inclined, by way of example.

The rotor in this case can be oriented facing the direction of inflowing air.

By way of example, the wind turbine has a support structure holding the wind power rotor, the gear device, and the generator.

The support structure can be anchored in a foundation at ground level, for example, or on a structural object, such as a built structure, for example, such as a building or a bridge structure, by way of example.

A third aspect of the invention is the use of a wind power rotor according to one of the previously named embodiments, examples, and aspects, in a wind turbine.

A fourth aspect of the invention is a method for the conversion of wind energy into drive energy for the generation of electrical current, comprising the following steps:

a) rotating a first rotor device about a first axis of rotation in a first direction of rotation by means of wind power, wherein the first rotor device has at least two rotor blades that move around a peripheral track about the first axis of rotation, wherein the rotor blades are arranged in such a manner that they describe a first virtual shell surface of a virtual first rotating body upon rotation about the first axis of rotation;

b) rotating a second rotor device about a second axis of rotation in a second direction of rotation that is opposite the first direction of rotation by means of a drive device, wherein the second rotor device has a second rotating body with a closed second shell surface, and wherein the second rotating body is at least partially arranged inside the virtual first rotating body, wherein the second rotor device functions to create a deflection of an air stream caused by wind inside the first rotor device, counter to the first direction of rotation, on the side which faces away from the wind; and c) driving a current generator by means of the first rotor device.

It is hereby noted that according to the invention, the drive energy obtained and/or converted from the wind energy can also be used for other work purposes in addition to the generation of electrical current.

One aspect of the invention is a combination of two different rotor devices, particularly a first partial rotor, so to speak, having rotor blades, in combination with a second rotating body designed as a closed body, wherein the inner, closed rotating body is exposed to the inflowing wind just like the first rotor, but only the first rotor, particularly the rotor blades, are driven by the wind itself. In contrast, the second rotor, meaning the second rotating body, is driven by the provision of a drive energy. This can be obtained from, for example, the wind power itself. The drive in this case is realized in the direction opposite that of the direction of rotation of the rotor blades, according to the invention, the same being driven by the wind. The rotation in the opposite direction creates a deflection of the air stream that flows through the wind power rotor in this case—meaning the air stream that flows through the first rotor device between the rotor blades, and/or causes the rotor blades to move in the process, by creating lift and/or propulsion (depending on the arrangement) on the rotor blades. The deflection by means of the second rotor blade creates a more favorable air stream with respect to the rotor blades, such that the wind energy is better exploited with respect to the generation of drive forces.

It is hereby noted that the features of the embodiments and aspects of the devices apply to the embodiments of the method as well as to the use of the device, and vice-versa. In addition, all features for which this is not explicitly indicated can also be freely combined with each other.

BRIEF DESCRIPTION OF THE DRAWING FIGURES

Embodiments of the invention are explained in greater detail below with reference to the attached drawings, wherein:

FIG. 1 shows a first exemplary embodiment of a wind power rotor according to the present invention, wherein

DETAILED DESCRIPTION

FIG. 1 shows a wind power rotor 10 having a first rotor device 12 and a second rotor device 14. The first rotor device 12 rotates about a first axis of rotation 16 and has at least two rotor blades 18 which move around a peripheral track 20 about the first axis of rotation 16.

The rotor blades in this case are arranged in such a manner that they describe a virtual first shell surface 22 of a virtual first rotating body 24 when they rotate about the first axis of rotation. This can be better seen in FIG. 4.

The second rotor device 14 rotates about a second axis of rotation 26 and has a second rotating body 28 with a closed second shell surface 30. This is likewise better seen in FIG. 4. The second rotating body 28 is arranged at least partially inside the virtual first rotating body 24.

The first rotor device 12 can be driven by wind in a first direction of rotation 32. This is described in greater detail in the context of FIG. 2A. The second rotor device 14 has a drive device 34 (see FIG. 1B) and can be driven in a second direction of rotation 36 which runs opposite the first direction of rotation 32.

Figure 1A:
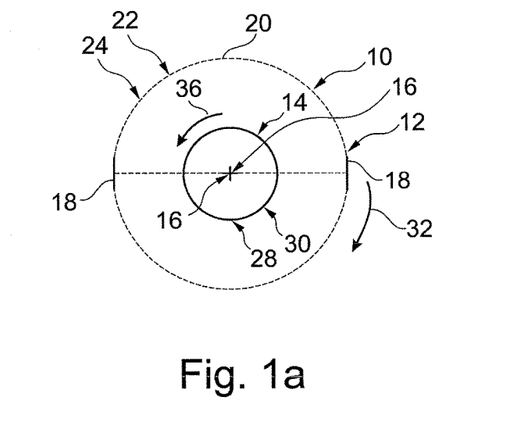
FIG. 1A shows a first view and FIG. 1B shows a second view at a transverse angle to the first.
Figure 1B:
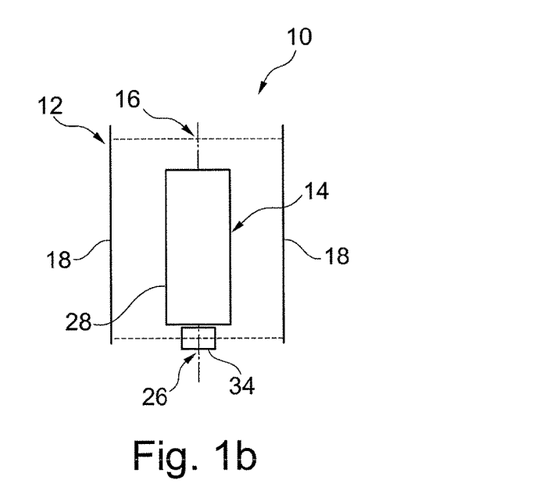

FIG. 1B shows the wind power rotor 10 in an illustration and/or point of view which is perpendicular to FIG. 1A.

Figure 2A:
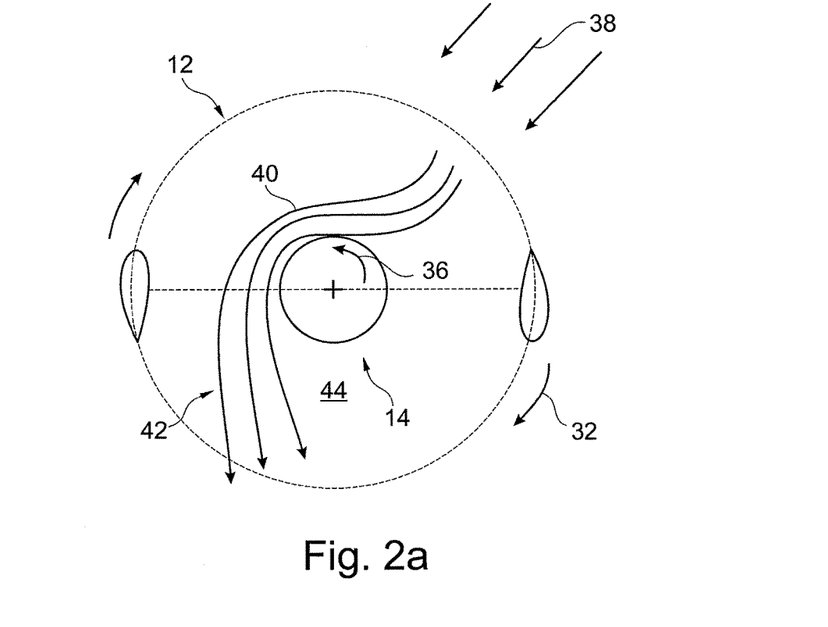
FIG. 2A shows a further embodiment of a wind power rotor according to the present invention.

As is shown in FIG. 2A, the second rotor device 14 functions to create a deflection of an air stream created by wind inside the first rotor device 12, in the direction opposite the first direction of rotation 32, on the side facing away from the wind. The air stream created by wind is indicated by three arrows 38 outside of the first rotor device 12, as well as by three arrows 40 which run inside the first rotor device, indicating the deflection by means of a change of direction 42 in their course.

The side which faces away from the wind is indicated in FIG. 2A by reference number 44.

As such, an air stream is created in the rearward area, so to speak, meaning on the lee side, which deviates from the primary wind direction and therefore the primary wind flow, and this is applied in a favorable manner to the rotor blades because the deflected air stream flows counter to the rotor blades, so to speak, in order to flow over the rotor blades in such a manner that an additional propulsion is generated on the blades.

Figure 2B:
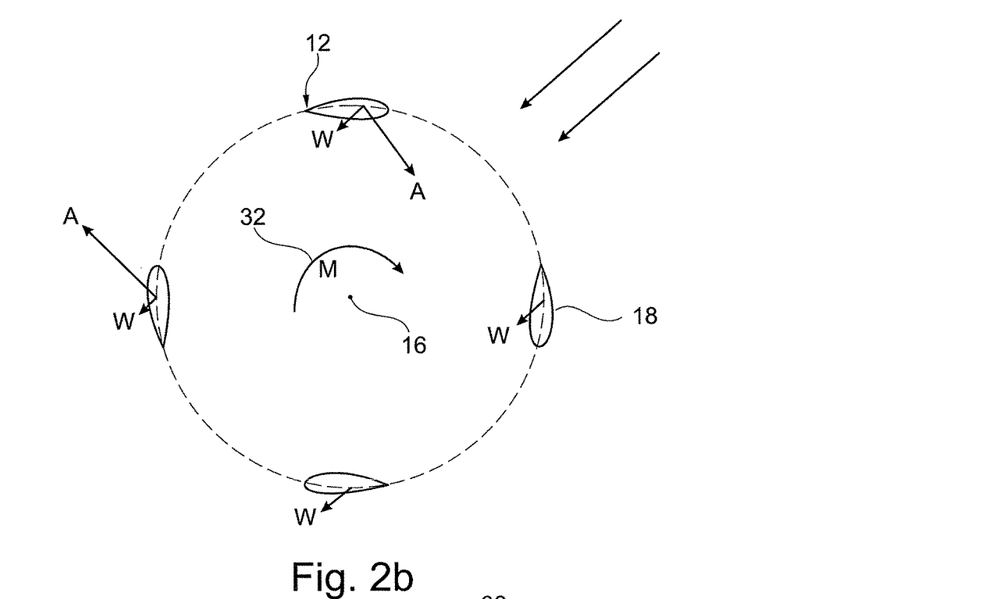
FIG. 2B shows a rotor device without a second rotor device according to the invention.

In FIG. 2B, the force vectors are indicated which are created by the effect of wind when the rotors are stationary, wherein no second rotor device 14 is arranged in FIG. 2B, although it is included in the invention. Each of the air drag forces W caused by the wind, and the propulsion and/or lift forces A caused by the air stream along the rotor blades are indicated qualitatively on the rotor blades 18 with corresponding arrows of different lengths.

Figure 2C:
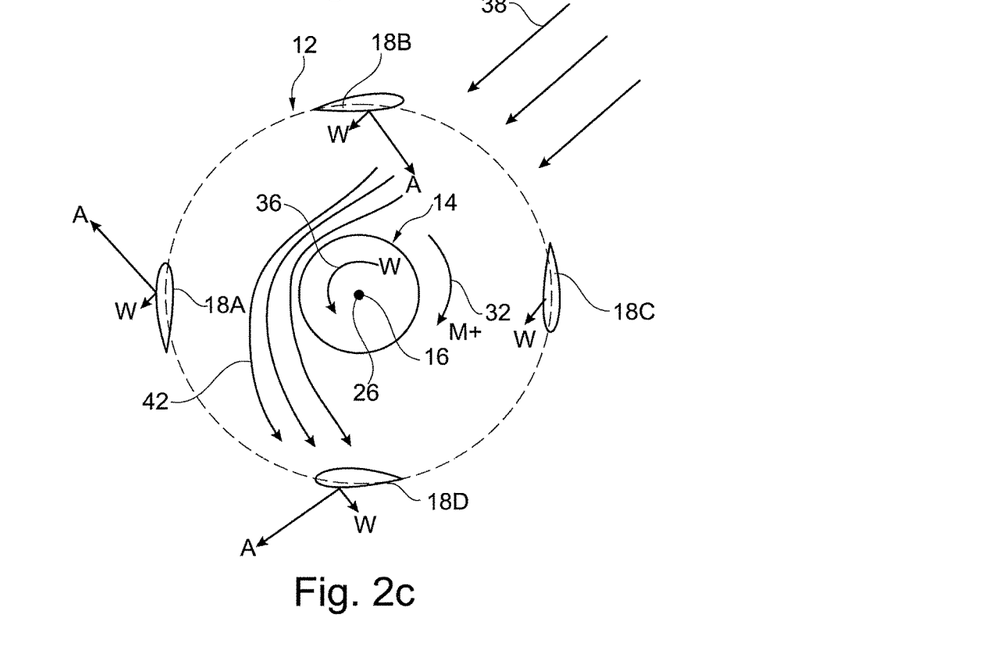
FIG. 2C shows a further embodiment of a wind power rotor according to the present invention.

The forces and/or force vectors generated according to the invention are illustrated in FIG. 2C by vectors drawn for four rotor blades 18a, 18b, 18c, and 18d. The Magnus effect caused by the rotation of the second rotating body is incorporated in the illustration.

The force vectors for the fourth rotor blade 18d show that significantly lower forces are generated in the variant shown in FIG. 2B, with no second rotor device 14, than in FIG. 2C—meaning the wind is not used as effectively.

It is hereby noted at this point that the first rotor device 12 can also have three, four or more rotor blades in addition to the two rotor blades shown in the majority of the figures, even though this is not illustrated in greater detail.

Figure 3:
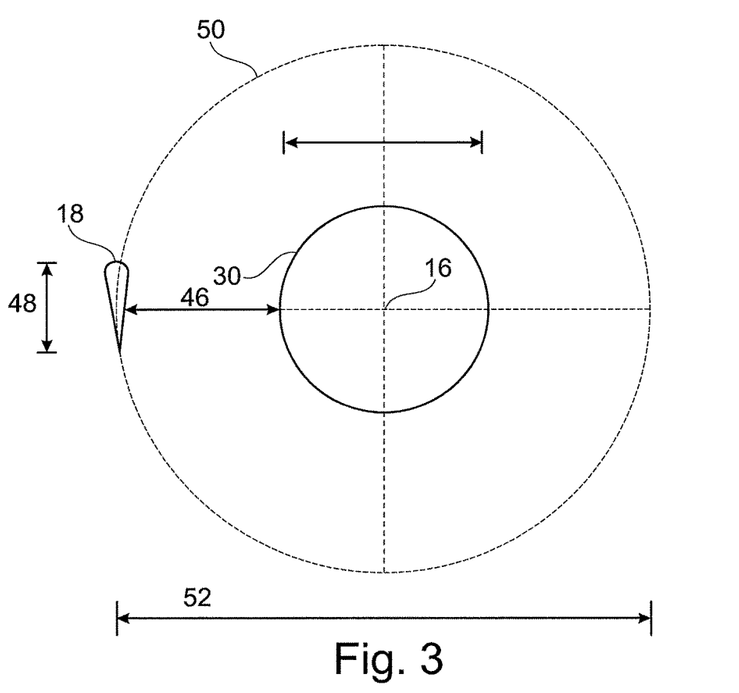
FIG. 3 shows a schematic illustration of further features of one example of a wind power rotor according to the present invention.

According to one embodiment shown in FIG. 3, a separation distance 46 is included between the second shell surface 30 and the rotating rotor blades 18 along the radius measured from radial center, and this separation distance 46 is 1 to 2-times the profile depth 48 of one rotor blade 18, by way of example. The profile depth in this case is the extension of the rotor blade in the direction of rotation. The rotor blades are arranged along a circular line 50 about the first axis of rotation 16, wherein the circle 50 has a diameter 52 that is 5- to 8-times the profile depth 48 of a rotor blade.

Figure 4:
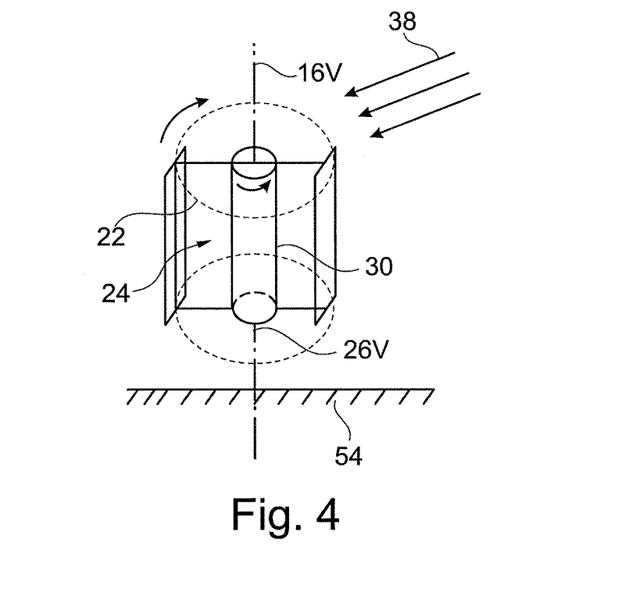
FIG. 4 shows a perspective sketch of a further embodiment of a wind power rotor according to the present invention.

According to a further embodiment shown in FIG. 4, the first axis of rotation 16 is a first vertical axis of rotation 16V, and the second axis of rotation 26 is a second vertical axis of rotation 26V.

The term "vertical" in this case relates to the installed position which is indicated schematically with a ground- and/or base hatching 54.

The features can also be included individually, as well as combined with other values.

Figure 5:
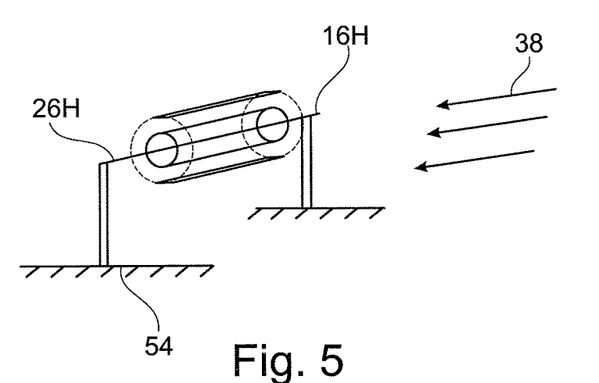
FIG. 5 shows a further perspective illustration of a further embodiment of a wind power rotor according to the present invention.

As shown in FIG. 5, the first axis of rotation 16 can be designed as a first horizontal axis of rotation 16H, and the second axis of rotation 26 as a second horizontal axis of rotation 26H.

Figure 6:
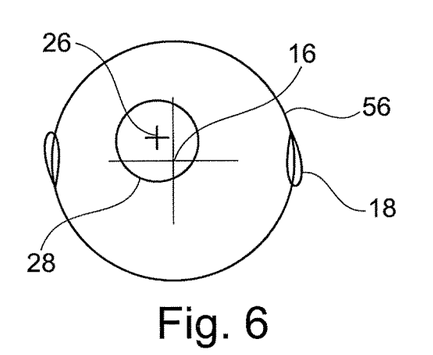
FIG. 6 shows a further embodiment of a wind power rotor according to the present invention.

The first and second axes of rotation 16, 26 can be arranged concentrically, as illustrated in FIGS. 1 to 5. According to a further embodiment which is shown in FIG. 6, the first and the second axes of rotation 16, 26 can also run with a displacement between the two, wherein the second rotating body 28 is arranged inside a movement path 56 of the rotor blades 18 during the rotation about the second axis of rotation 26.

Figure 7:
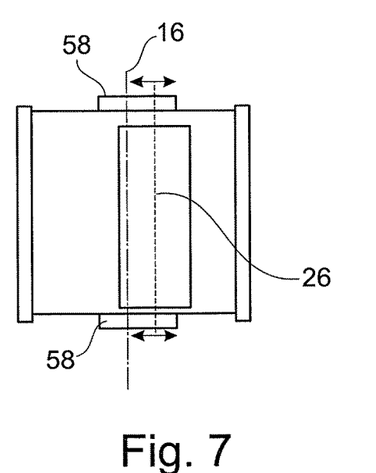
FIG. 7 shows a further embodiment of a wind power rotor having a device for the displacement of axes of rotation according to the present invention.

The displacement can be adjustable, for example by means of an adjustment device 58 as indicated in FIG. 7.

Figure 8:
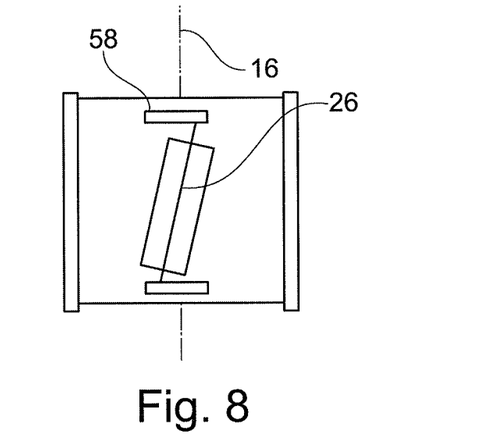
FIG. 8 shows a further embodiment with displaced axes of rotation according to the present invention.

While FIG. 7 shows a parallel displacement of the two axes of rotation 16, 26, an inclined extension of the second axis of rotation 26 with respect to the first axis of rotation 16 can also be set by means of the adjustment device 58, as indicated in FIG. 8.

Figure 9A:
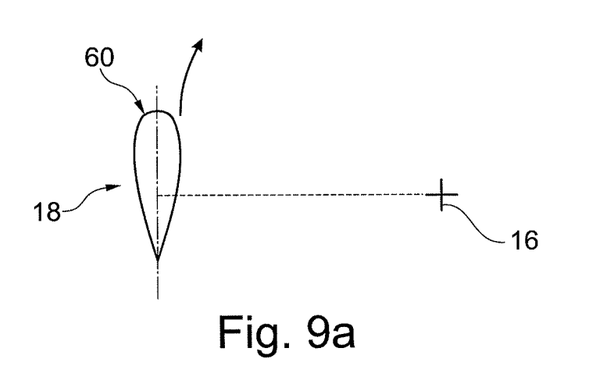
FIGS. 9A and 9B show embodiments of a rotor blade in cross-section according to the present invention.

The rotor blades can have a symmetric cross-section, for example a symmetric wing cross-section 60 as shown in FIG. 9A by a cut line for a cross-section.

Figure 9B:
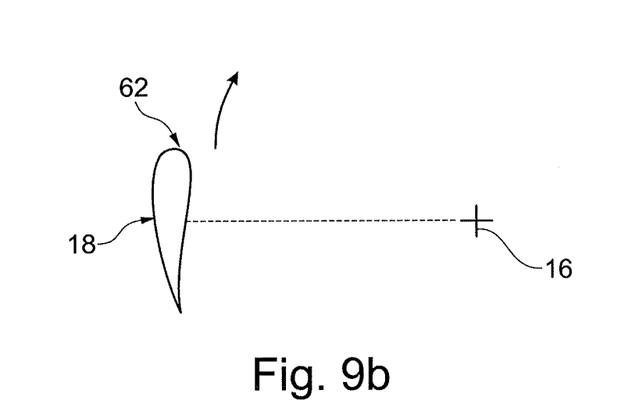

FIG. 9B shows one embodiment wherein the rotor blades 18 have a wing cross-section 62 with a curve.

It is hereby noted that the first rotor device 12 can be constructed with different rotor blades and/or different cross-section shapes of the rotor blades 18.

Figure 10A:
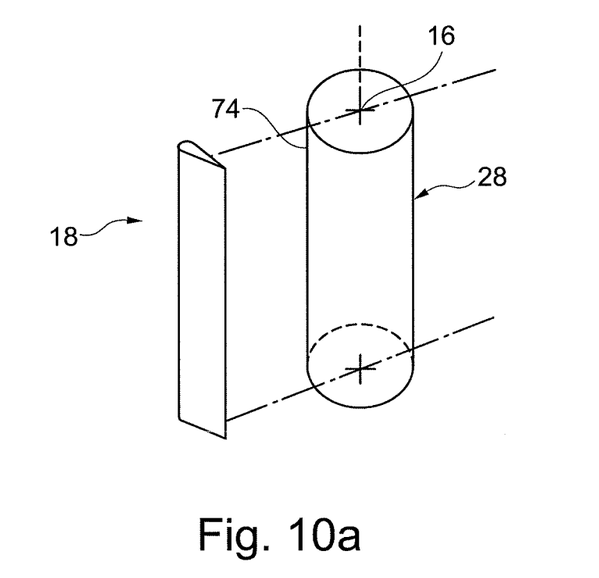
FIGS. 10A and 10B show embodiments of a second rotor blade according to the present invention.

The rotor blades 18 can be designed with a continuous profile regardless of their cross-section shape, as is shown in FIG. 10A in a perspective cross-section view.

Figure 10B:
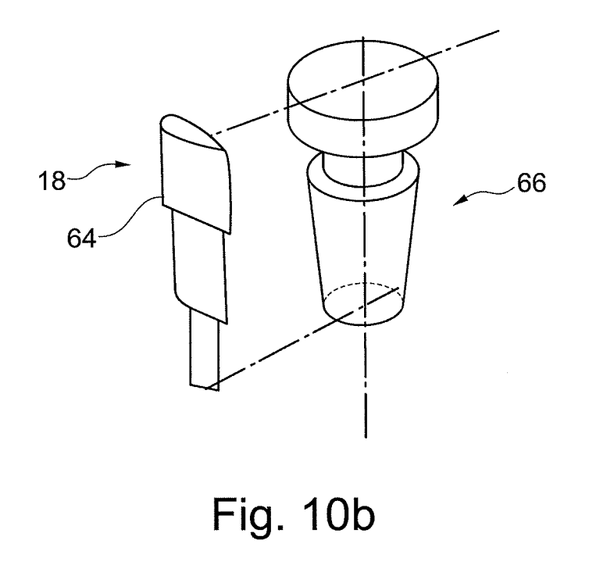

However, the rotor blades 18 can also be divided into rotor blade segments 64, and can be constructed differently along the entire length, as is shown in FIG. 10B.

As is likewise illustrated in FIGS. 10A and/or 10B, the second rotating body 28 can be designed with a continuous and/or consistent shape as is shown in FIG. 10A, or can be likewise divided into segments 66 as is shown in FIG. 10B.

It is hereby noted that the named features can also be combined in different ways. In particular, a continuous rotor blade can be combined with a segmented second rotating body 28, and a segmented rotor blade 18 can be combined with a continuous second rotating body 28—meaning that the segmentation is not restricted in the shown embodiment variants in its combination with any other rotor.

Figure 11A:
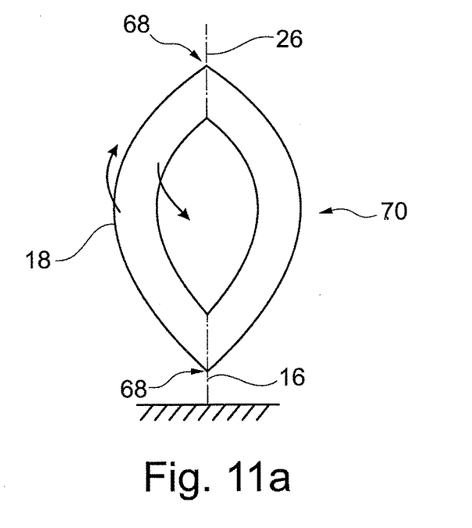
FIG. 11A to 11C show embodiments of first rotor devices having at least two rotor blades according to the present invention.

The rotor blades 18 can be arranged with their two ends 68 closer to the axis of rotation 16 than their region 70 between the two ends 68, wherein the rotor blades project outward with a curved shape, for example, as is shown in FIG. 11A.

Figure 11B:
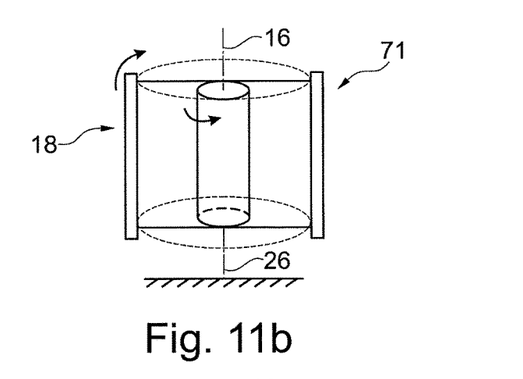

As an alternative thereto, the rotor blades 18 can run parallel to the first axis of rotation 16 (see FIG. 11B), and can particularly be designed as H-Darrieus rotors 71.

Figure 11C:
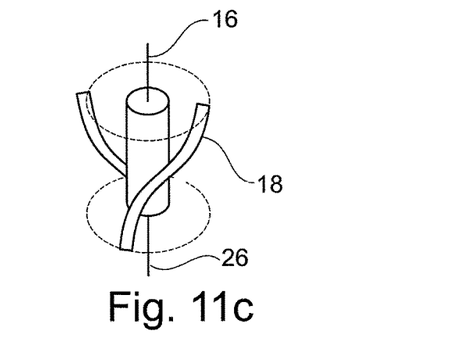

The rotor blades 18 can also be curved in a helical shape as shown in FIG. 11C.

Figure 12A:
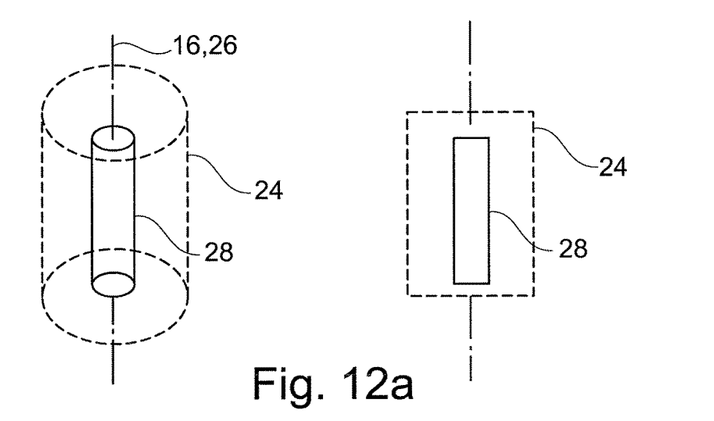
FIG. 12A to 12C show embodiments of wind power rotors according to the present invention.
Figure 12B:
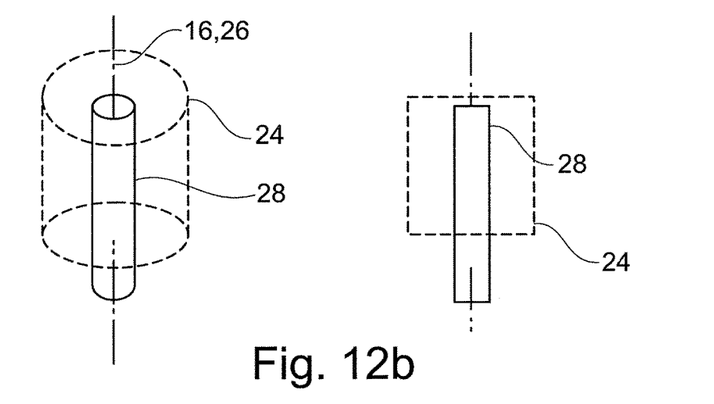
Figure 12C:
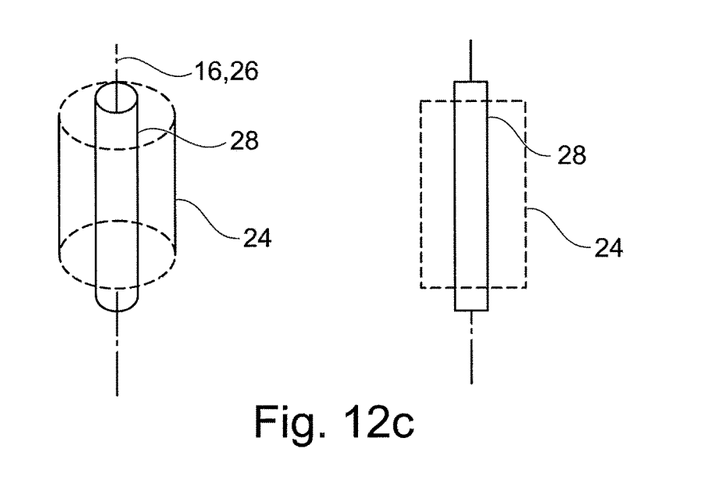

FIGS. 12A to 12C show different embodiments of the ratio of the second rotating body 28 to the virtual first rotating body 24, which is illustrated in FIGS. 12A to 12C as dashed peripheral lines for reasons of simplicity. In the left region of each of the figures, a perspective schematic sketch is shown, and a simplified view is given to the right thereof.

At this point, it is hereby expressly stated that, for all the figures shown and for all the described embodiments, the axes of rotation can run horizontally, vertically, or at an incline, even if a vertical axis arrangement is illustrated in the figures with respect to the orientation of the paper. In other words, each of the described features refers to the relations thereof with each other, and does not form a reference to the vertical or horizontal unless this is explicitly mentioned in the description or can be seen in the figures, for example presented by means of a hatching to indicate the ground.

The second rotating body 28 can be arranged entirely inside the virtual first rotating body 24 (FIG. 12A). The second rotating body 28 can partially project in the axial direction out of the virtual first rotating body, as is shown in FIG. 12B for a projection on an end face, while FIG. 12C shows a variant wherein the second rotating body 28 projects out of the virtual first rotating body 24 with both of its end faces.

The projection on the end faces of the virtual rotation body is non-problematic in principle, because no movement of the rotor blades takes place there, because these only move in the region of the virtual shell surface, meaning inside the same. From this point of view, construction considerations such as that the rotor blades can be held rotating on the first axis of rotation 16, for example, are completely out of the question. If the second rotating body projects out of the virtual first rotating body, of course no direct attachment can be realized in these regions. Rather, another manner of bearing and/or another attachment option must be provided.

As already illustrated several times, the second rotating body 28 can have a circular cross-section which is consistent over the second axis of rotation 26, and can form a cylinder 74 (see FIG. 10A, for example).

Figure 13A:
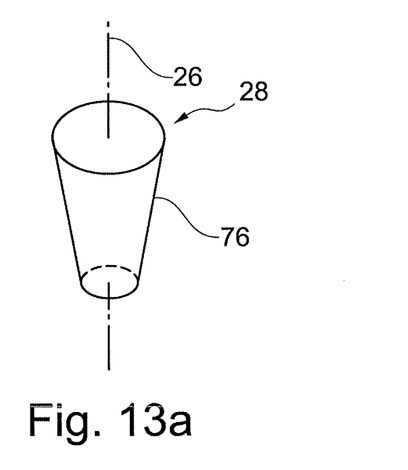
FIG. 13A to 13C show embodiments of a second rotating body according to the present invention.
Figure 13B:
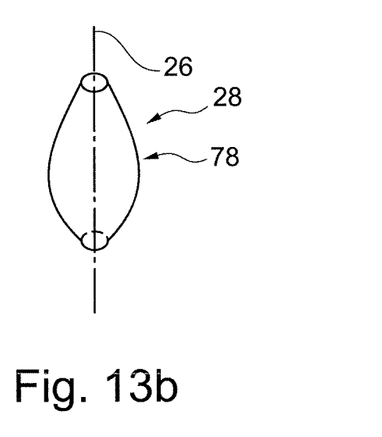
Figure 13C:
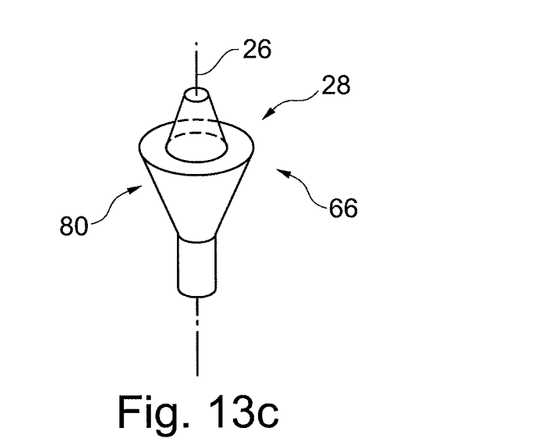

The second rotating body 28 can also be designed as a truncated cone 76 (see FIG. 13A). The second rotating body 28 can also have different diameters along the second axis of rotation 26, for example proceeding from a minimal diameter to a continuously growing diameter that is then reduced again, as is schematically shown in FIG. 13B. The second rotating body 28 can be designed with a hyperbolic contour 78, by way of example.

As indicated above in FIG. 10B, the second rotating body 28 can also be divided into segments 66 that can be combined into accordingly complex composite shapes 80. The segments in this case are also rotationally symmetric.

The segments in this case can be connected to each other and accordingly driven at the same speed, or can also be driven at different speeds if they are not connected to each other in a rotationally-fixed manner (not illustrated).

Figure 14A:
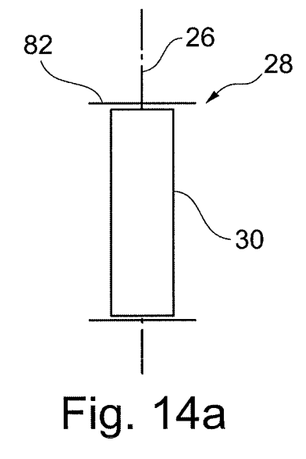
FIGS. 14A and 14B show embodiments of a second rotating body according to the present invention.

The second rotating body 28 can have an end disk 82 that projects beyond the second shell surface 30 in the region of its first and/or second end, as is shown particularly in FIG. 14A.

The second rotation body 28 can also have a plurality of disks 84 arranged between the two ends, wherein the disks 84 have a larger diameter than the neighboring shell surface segments.

Figure 14B:
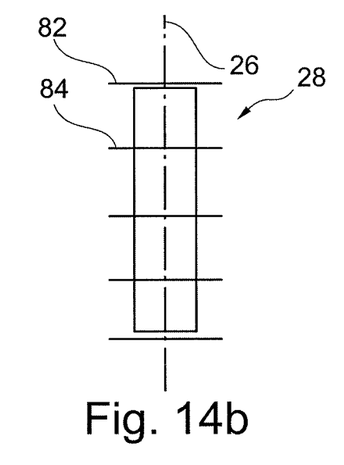

Multiple such disks 84 are shown in FIG. 14B together with two end disks 82, wherein it is nevertheless hereby noted that neither the shown number of the disks nor the combination with the end disks is a rigid prerequisite. Rather, the disks 84 can also be used without the end disks 82.

Figure 15:
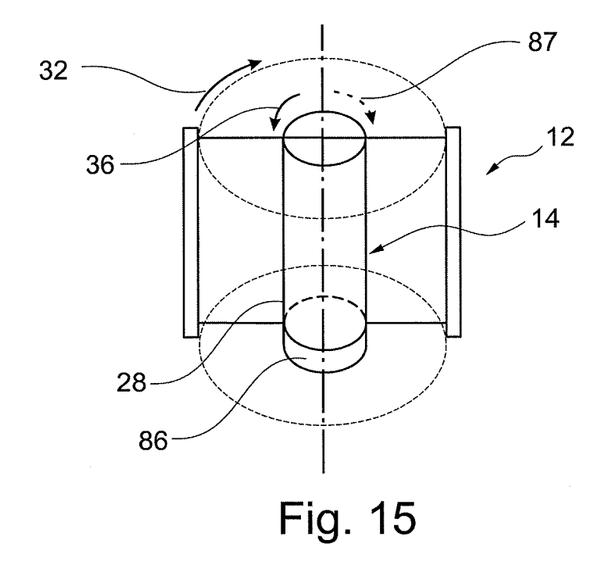
FIG. 15 shows a further embodiment of a wind power rotor according to the present invention.

FIG. 15 shows a gear unit 86 arranged below the second rotating body 28 with respect to the orientation of the illustration, which belongs to the drive device 34. The gear unit is included between the first rotor device 12 and the second rotor device 14, wherein the gear unit 86 implements a transmission ratio for the rotation speed in addition to the reversal of the direction of rotation mentioned above.

The transmission ratio of the gear device 86 can be alterable, by way of example.

According to a further example, the gear unit 86 has a transmission ratio dependent on the speed of rotation of the first rotor device 12. This can be implemented, by way of example, according to an actual wind inflow speed and/or wind strength.

In order to prevent excessively fast rotation of the first rotor device 12 when wind speeds are too high, the drive device 34 and/or the gear unit 86 can be constructed in such a manner that the second rotating body 28 can also be driven in the first direction of rotation 32, meaning opposite the second direction of rotation 36 as indicated in FIG. 15 by a dashed arrow 87, which runs counter to the second direction of rotation. In the case of such a concurrent rotation of the two rotor devices 12, 14, the efficiency, which is actually desired, is reversed—meaning that the degree of efficiency is significantly reduced compared to a variant without the second gear unit. In other words, the concurrent rotation functions to brake the first rotor device 12.

Figure 16:
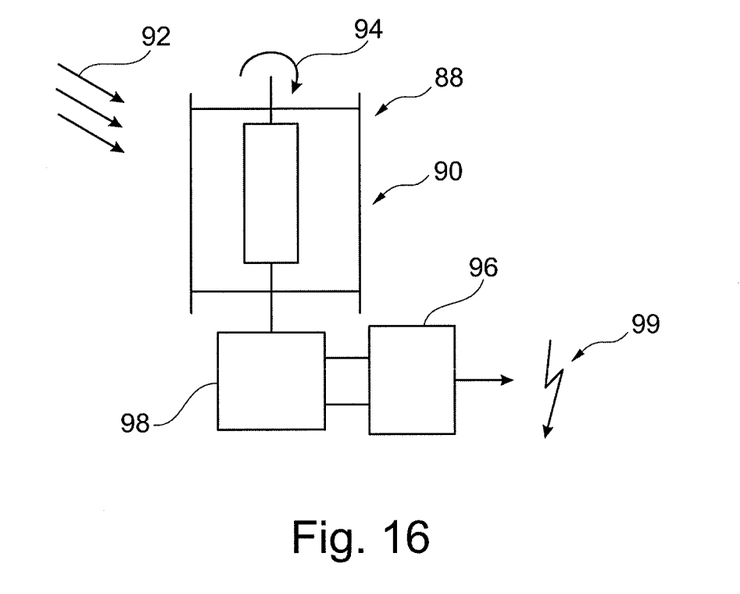
FIG. 16 shows one embodiment of a wind power rotor according to the present invention.

According to the invention, a wind turbine 88 is also provided, which is shown schematically in FIG. 16. The wind turbine 88 has a rotor 90 for the purpose of converting wind movement, indicated with three arrows 92, into a rotation movement, wherein the rotary movement is schematically illustrated with a first rotation arrow 94.

In addition, the wind turbine 88 has a generator 96 for the purpose of converting the movement energy of the rotary movement into electrical energy.

In addition, a gear device 98 for the purpose of coupling the rotor to the generator 96 is provided, for the transmission of the rotary movement to the generator 96. The generator 96 then generates electrical energy, which is illustrated by a corresponding symbol 99. According to the invention, the gear device can also be coupled to a work device (not illustrated); or the rotor is directly coupled to a work device which in turn has a manner of gearing. Instead of providing electrical energy, work can be performed by means of the wind power, for example pumping, etc.

It is hereby noted that the individual connections between the individual components in FIG. 16 are of course only illustrated schematically, and do not illustrate anything about an actual constructive embodiment. In particular, the individual components of the wind turbine 88 can be constructed as integral units.

Figure 17:
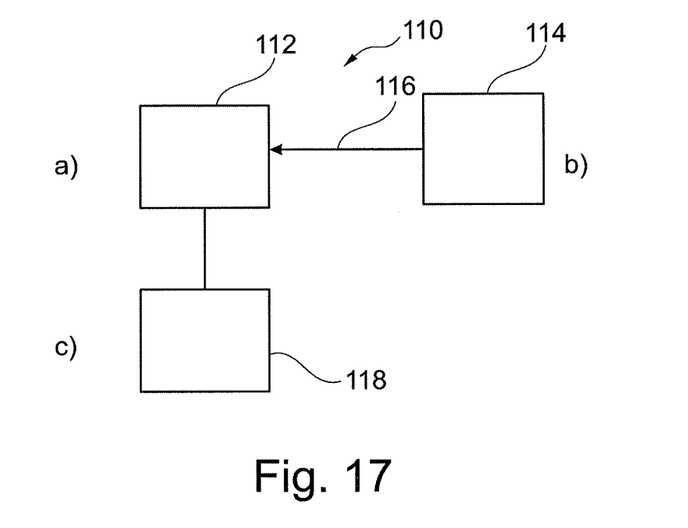
FIG. 17 shows one embodiment of a method for the conversion of wind energy into drive energy according to the present invention.

According to the present invention, a method 110 for the conversion of wind energy into drive energy, for the purpose of generating electrical current, is provided, as is schematically illustrated in FIG. 17. The method 110 has the following steps:

In a first rotation step 112, a first rotor device is rotated about a first axis of rotation, in a first direction of rotation, by wind power, wherein the first rotor device has at least two rotor blades that move on a peripheral track about the first axis of rotation, wherein the rotor blades are arranged in such a manner that they describe a virtual first shell surface of a virtual first rotating body upon rotation about the first axis of rotation.

In a second rotation step 114, a second rotor device is rotated about a second axis of rotation, in a second direction of rotation, wherein the second direction of rotation is counter to the first direction of rotation, and the rotation is achieved by a drive device, wherein the second rotor device has a second rotating body with a closed second shell surface, and wherein the second rotating body is arranged at least partially inside the virtual first rotating body. The second rotor device in this case functions to create a deflection 116 of an air stream caused by wind inside the first rotor device, on the side which faces away from the wind, counter to the first direction of rotation.

In a drive step 118, a current generator is then driven by the first rotor device.

In place of the driving of the generator, a work device can also be driven.

The first rotation process 112 is indicated as step a), the second rotation process 114 as step b), and the drive process, and/or the drive step 118, as step c).

The embodiments described above can be combined in different ways. In particular, aspects of the method can be used for embodiments of the devices, as well as for the use of the devices, and vice-versa.

It is also hereby noted that the term "has" does not exclude any other elements or steps, and "one" or "a" does not rule out a plurality. In addition, it is hereby noted that features or steps which have been described with reference to one of the embodiments and aspects given above can also be used in combination with other features or steps of other embodiments and aspects described above. Reference numbers in the claims are not intended to indicate any restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wind power rotor, comprising:
a first rotor device that rotates about a first axis of rotation and has at least two rotor blades that move on a peripheral track about the first axis of rotation, wherein the at least two rotor blades are arranged in such a manner that they define a virtual first shell surface of a virtual first rotating body upon rotation about the first axis of rotation; and
a second rotor device that rotates about a second axis of rotation and has a second rotating body with a closed second shell surface, wherein the second rotating body is arranged at least partially inside of the virtual first rotating body,
wherein the first rotor device is driven by wind in a first direction of rotation to convert wind energy into a drive force, and the second rotor device is driven in a second direction of rotation running counter to the first direction of rotation,
wherein, of the first and second rotor devices, only the first rotor device is driven by wind by virtue of the closed second shell surface, and
wherein the second rotor device produces a deflection of an air stream caused by the wind inside of the first rotor device against the first direction of rotation on a side of the second rotor device facing away from the wind.

2. A wind power rotor according to claim 1, wherein the first axis of rotation is a first vertical axis of rotation, and the second axis of rotation is a second vertical axis of rotation.

3. A wind power rotor according to claim 1, wherein the first axis of rotation is a first horizontal axis of rotation, and the second axis of rotation is a second horizontal axis of rotation.

4. A wind power rotor according to claim 1, wherein the first rotor device has a Darrieus rotor.

5. A wind power rotor according to claim 1, wherein upper and lower ends of the at least two rotor blades are arranged closer to the first axis of rotation than a region between the upper and lower ends, and the at least two rotor blades project outward with a curved shape.

6. A wind power rotor according to claim 1, wherein the at least two rotor blades run parallel to the first axis of rotation.

7. A wind power rotor according to claim 1, wherein the second rotating body is arranged entirely inside of the virtual first rotating body.

8. A wind power rotor according to claim 1, wherein the second rotating body has different diameters along the second axis of rotation.

9. A wind power rotor according to claim 1, further comprising a gear between the first rotor device and the second rotor device, wherein the gear transmits a rotation speed and reverses a direction of rotation.

10. A wind power rotor according to claim 1, further comprising an electric motor that is driven by electrical current.

11. A wind power rotor according to claim 1, wherein the second rotating body is selectively rotated in the first direction of rotation as well as in the second direction of rotation.

12. A wind turbine, comprising:
a rotor configured to convert wind movement into a rotary movement;
a generator that converts movement energy of the rotary movement into electrical energy; and
a gear that couples the rotor to the generator to transmit the rotary movement to the generator;
wherein the rotor is a wind power rotor, the wind power rotor comprising:
a first rotor device that rotates about a first axis of rotation and has at least two rotor blades configured to move on a peripheral track about the first axis of rotation, wherein the at least two rotor blades are arranged in such a manner that they define a virtual first shell surface of a virtual first rotating body upon rotation about the first axis of rotation; and
a second rotor device that rotates about a second axis of rotation and has a second rotating body with a closed second shell surface, wherein the second rotating body is arranged at least partially inside of the virtual first rotating body, wherein the first rotor device is driven by wind in a first direction of rotation to convert wind energy into a drive force, and the second rotor device is driven in a second direction of rotation running counter to the first direction of rotation, wherein, of the first and second rotor devices, only the first rotor device is driven by wind by virtue of the closed second shell surface, and wherein the second rotor device produces a deflection of an air stream caused by the wind inside of the first rotor device against the first direction of rotation on a side of the second rotor device facing away from the wind.

13. A method for converting wind energy into drive energy to generate electrical current, comprising the following steps:

a) rotating a first rotor device about a first axis of rotation, in a first direction of rotation, by means of wind power, wherein the first rotor device has at least two rotor blades moving on a peripheral track about the first axis of rotation, wherein the at least two rotor blades are arranged in such a manner that they describe a virtual first shell surface of a virtual first rotating body upon rotation about the first axis of rotation;

b) rotating a second rotor device about a second axis of rotation, in a second direction of rotation opposite of the first direction of rotation, wherein the second rotor device has a second rotating body with a closed second shell surface, wherein the second rotating body is arranged at least partially inside of the virtual first rotating body, wherein the second rotor device achieves a deflection of an air stream created by wind inside of the first rotor device, on a side of the second rotor device facing away from the wind, opposite the first direction of rotation, wherein, of the first and second rotor devices, only the first rotor device is driven by wind by virtue of the closed second shell surface; and c) driving of a current generator by the first rotor device.

* * * * *